United States Patent [19]

Matsushima et al.

[11] Patent Number: 4,459,376

[45] Date of Patent: Jul. 10, 1984

[54] RESIN-COATED SAND FOR SHELL-MOLDS AND METHOD FOR PRODUCING SAME

[75] Inventors: Noriaki Matsushima; Yukio Saeki; Yukio Tokunaga, all of Fujieda, Japan

[73] Assignee: Sumitomo Durez Company, Ltd., Tokyo, Japan

[21] Appl. No.: 435,210

[22] Filed: Oct. 19, 1982

[30] Foreign Application Priority Data

Oct. 26, 1981 [JP] Japan .................................. 56-169968

[51] Int. Cl.³ ................................................ C08K 3/26
[52] U.S. Cl. ..................................... 523/145; 524/424; 524/425
[58] Field of Search ................. 523/145; 524/424, 425

[56] References Cited

U.S. PATENT DOCUMENTS 4,290,928  9/1981  Funabiki et al. ..................... 523/145
4,317,896  3/1982  Holik .................................. 523/145

FOREIGN PATENT DOCUMENTS 958342  5/1964  United Kingdom ................ 523/145

*Primary Examiner*—Lewis T. Jacobs
*Attorney, Agent, or Firm*—James F. Tao; James F. Mudd

[57] ABSTRACT

A process for the preparation of a resin-coated sand for use in shell-molding operations wherein the molding operation is designed for metals such as aluminum, magnesium and their alloys which have a lower-melting temperature than iron. The process involves the coating of foundry sand with a phenolic resin incorporating a carbonate and/or bicarbonate of elements selected from groups Ia, IIa, IIIb, IVb, Vb, VIb, VIIb or VIII. This process produces a resin-coated sand with improved shake-out properties of the casting molds.

20 Claims, 1 Drawing Figure

RESIN-COATED SAND FOR SHELL-MOLDS AND METHOD FOR PRODUCING SAME

BACKGROUND OF THE INVENTION

The present invention relates to an improved resin-coated sand to be used in a shell-molding process. In conventional sand-molding operations, a mixture of sand coated with binder is placed in the mold, and the heat of the processing steps causes reactions to occur between the binder components to improve the pressed strength of the sand and retain the configuration of the part to be cast. After introduction of the molten metal into the cavity, the heat of the metal, during the cooling cycle is transferred to the sand-binder mixture causing the binder to be destroyed to a degree that allows the sand to be removed from the cast metal in an efficient manner.

In the automobile industry, the trend of manufacturers has led to the replacement of iron and steel castings with lighter weight metals such as aluminum, magnesium and their alloys. These castings are produced by sand-molding processes, but occur at lower temperatures than iron castings. The use of conventional binders, at these lower temperatures, have created problems in the removal of the sand particles from the castings due to the failure of the binder to be decomposed.

In the case of iron casting, the stock temperature of shell-mold reaches 800°–1000° C. at pouring, and the strength of shell-mold is naturally reduced after casting because almost all the phenolic resin binder is subjected to thermal degradation by the intense heat at pouring. Accordingly it is easy to remove the mold-core from molded articles in the form of sand grains after casting.

For metals having a lower melting temperature, such as aluminum and magnesium, the stock temperature of shell-mold at pouring is rather low, approximately 300°–400° C. This results in an incomplete thermal degradation of the phenolic resin binder. Since conventional shell-molds have retained superfluous strength after casting for this reason, there have been extreme difficulties particularly for complicated mold structures, in removing the core efficiently from molded articles. In these cases, flogging is required so as to crush the molds even after time-consuming calcination thereof in a furnace to remove the occluded core therefrom. Flogging is a term used to indicate a tapping or impact force applied to the castings to remove the particulate sand particles leaving a clean cast structure.

After much investigation to improve the shake-out property of shell-molds after casting metals having a lower melting temperature, such as aluminum, the inventors have found that the shake-out property of cast shell-molds is greatly improved by using a resin-coated sand produced by coating foundry sand with a phenolic resin in the presence of a carbonate or bicarbonate (hereafter abbreviated carbonates) of elements selected from groups Ia, IIa, IIIb, IVb, Vb, VIb, VIIb and VIII of the Periodic Table of Elements.

It is an object of this invention to provide a resin binder for shell-molding operations that will provide a coated foundry sand possessing sufficient strength for casting molten metals, such as aluminum, magnesium and their alloys, and upon cooling of the casting, will allow easy removal of the sand from the cast object.

It is an additional object of this invention to provide a resin binder for foundry sand that upon completion of the molding cycle will be sufficiently degraded or decomposed that the sand can be reused easily in subsequent molding operations.

SUMMARY OF THE INVENTION

The invention relates to an improved resin-coated sand for use in shell-molding processes and the method for preparation of the resin binder used therein.

With the introduction of lightweight metals into the automotive industry, the sand-molding process for the casting of these metals, e.g, aluminum and magnesium, have created problems in the removal of the cast items from the sand-molds. Insufficient heat of these lower temperature castings do not degrade the resin binder for the sand to the degree allowing easy removal of the cast item.

This invention provides an improved binder resin that eliminates the problem of sand removal. The binder is composed of a phenolic resin incorporating a carbonate and/or bicarbonate which provides adequate strength for molding and improved shake-out properties.

DETAILED DESCRIPTION OF THE INVENTION

Figure 1:
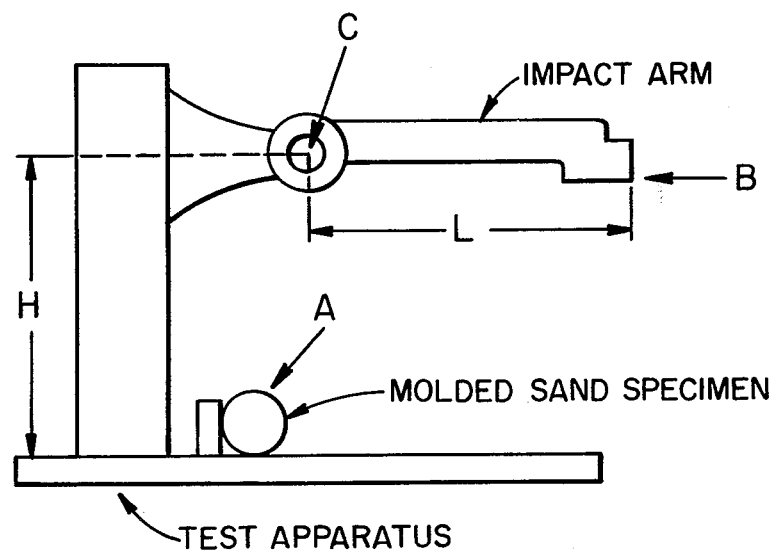
FIG. 1 is a side view of the test device used to determine the shake-out property of the cured resin-coated sand.

After much investigation to improve the shake-out property of shell-molds after casting metals having a lower melting temperature, such as aluminum, the inventors hereof have found that the shake-out property of cast shell-molds is improved by using resin-coated sand produced by coating foundry sand with a phenolic resin in the presence of a carbonate and/or a bicarbonate (hereinafter abbreviated "carbonates") of elements selected from those belonging to such groups in Periodic Table of Elements as Ia, IIa, IIIb, IVb, Vb, VIb, VIIb and VIII.

In order to improve the shake-out property after casting metals having a low melting temperature such as aluminum, the chemical crosslinking structure of cured phenolic resin binders must thermally be degraded and disintegrated at a relatively lower temperature range of 300° to 400° C. In ordinary phenolic resins, whether they be novolac-type or resole-type resins, said chemical cross-linking structure therein consists of such as methylene, methine and dimethylene-ether groups. Among them, the dimethylene-ether group changes by heat to a methylene group. On the other hand both the methylene and methine groups are stable to thermal decomposition, so they require much more energy for decomposition. Both the methylene and methine groups gradually begin to decompose at about 250°, however, a higher temperature range of 600° to 1000° C. is necessary for rapid decomposition of the main portion thereof. The thermal decomposition of phenolic resins is thought to be a thermal oxidation process whether exposed to either an oxidative or an inert atmosphere. In an inert atmosphere, it is thought that much of the oxygen contained therein contributes to the initiation of oxidation. It is further thought that both the methylene and ethine groups change to hydroperoxides due to said thermal oxidation, and finally yield carboxylic acids through decomposition of dihydrobenzophenone. Accordingly, adding a compound, having a catalytic effect of reducing the activation energy of oxidation and/or thermal decomposition of methylene and methine groups, appears to be an effective method for causing a thermal decomposition of phenolic resins in a lower temperature range of 30020 to 400° C. Some known additives suitable for the purpose were oxidants, peroxides and halogenated substances.

The inventors hereof have found that the shake-out peoperty of shell-molds is improved in the presence of carbonates without lowering the initial strength of shell-molds as well as the odor and toxicity of emitted gas from the carbonates upon the decomposotion thereof. Said carbonates according to the present invention are carbonates of elements selected from groups Ia, IIa, IIIb, IVb, Vb, VIb, VIIb, and VIII in Periodic Table of Elements, such as cobalt carbonate, maganese carbonate, sodium bicarbonate, sodium carbonate, potassium carbonate, barium carbonate, zirconium carbonate, potassium bicarbonate, strontium carbonate, nickel carbonate, magnesium carbonate, lithium carbonate, calcium carbonate, etc. One or more thereof are usable in the present invention. Above all, cobalt carbonate, maganese carbonate and sodium bicarbonate are effective. The proportion of carbonates present in a phenolic resin binder is most preferably 0.5 to 50 to 100 parts by weight of phenolic resin. When the proportion is less than 0.5 parts by weight, it is difficult to obtain an excellent shake-out property, and when the proportion is more than 50 parts by weight, it impairs the initial strength of shell-molds and the curing behavior of resin-coated sand.

The proper time for incorporating carbonates during the process of preparing phenolic resin is optional: at the beginning, during or after reacting phenols with formaldehyde. Or alternately, after preparing said solid phenolic resin, carbonates are incorporated thereinto by mix-grinding or melt-mixing with a kneading machine such as an extruder. It is also possible to incorporate the carbonates during the resin-coated sand production steps. The proper time for incorporating carbonates thereinto is optional: prior to, during or after adding the phenolic resin thereinto. Carbonates are incorporated either as they are, or as dispersed in a medium. Any incorporating method improves the shake-out property of shell-molds obtained from resin-coated sand thus produced.

The phenolic resins used in the present invention are of the novolac-type, the resole-type or a mixture thereof. Phenols for preparing said phenolic resins are phenol, cresol, xylenol, etc., however, they are usable in the presence of resorcin, cathecol, hydroquinone, aniline, urea, melamine, cashew nut shell oil, etc. Formaldehyde for preparing said phenolic resins is selected from formalin, paraformaldehyde, trioxane, etc. Catalysts for the reaction of phenol and formaldehyde are acidic substances generally such as oxalic, hydrochloric and sulfuric acid, and organic metal salts for novolac-type resin preparation. Basic substances generally selected from such as ammonia, triethylamine, sodium hydroxide, and barium hydroxide, are catalysts used for resole-type resin preparation. Lubricants are usable according to the present invention, which are ordinary ones, however, preferable are ethylene bis-stearic amide, methylene bis-stearic amide, oxystearic amide stearic amide and methylol stearic amide. Lubricant-containing phenolic resins can be obtained by adding said lubricant to phenolic resins at any stage of their preparation; prior to, during or after the reaction.

Methods for producing resin-coated sand in the present invention may be any of the commercial hot-coating, semi-hot-coating, cold-coating, and powder-solvent coating methods, however, hot-coating is preferably recommended for the present invention.

The inventors hereof will explain the present invention by the following nonlimitative Examples and Comparative Examples, wherein "parts" and "percent" indicate "parts by weight" and "percent by weight", respectively.

PREPARATION EXAMPLES 1, 2 and 3

To each of three kettles with a reflux cooler and a stirrer, 1000 parts of phenol, 650 parts of 37% formalin, and 10 parts of oxalic acid were charged. The temperature of each kettle was gradually elevated, and upon reaching 96° C., reflux continued for 120 minutes. 10 parts of methylene bis-stearic amide, and 200 parts each of cobalt carbonate, manganese carbonate, and sodium bicarbonate were added respectively to each of these kettles. After mixing, the reaction mixtures were dehydrated under vacuum and dumped to obtain 1070 parts of the respective novolac-type phenolic resins. Proportion of carbonates incorporated into 100 parts of said novolac-type phenolic resins was 10 parts, respectively.

PREPARATION EXAMPLES 4, 5 and 6

To each of three kettles with a reflux cooler and a stirrer, 1000 parts of phenol, 1795 parts of 37% formalin, 160 parts of 28% aqueous ammonia, and 60 parts of 50% sodium hydroxide solution were charged. The temperature of each kettle was gradually elevated, and upon reaching 96° C., was refluxed for 30 minutes, 40 parts of methylene bis-stearic amide, and 220 parts each of cobalt carbonate, manganese carbonate, and sodium bicarbonate were added respectively to each of these kettles. After mixing, the reaction mixtures were dehydrated under vacuum, dumped, and rapidly cooled to obtain 1320 parts of the respective resole-type phenolic resins. Proportion of carbonates incorporated into 100 parts of said resole-type phenolic resins was 20 parts, respectively.

PREPARATION EXAMPLE 7

To a kettle with a reflux cooler and a stirrer, 1000 parts of phenol, 650 parts of 37% formalin, and 10 parts of oxalic acid were charged. The temperature of each kettle was gradually elevated, and upon reaching 96° C., was refluxed for 120 minutes. 10 parts of methylene bis-stearic amide was added.

After mixing, the reaction mixture was dehydrated under vacuum and dumped to obtain 970 parts of novolac-type phenolic resin.

PREPARATION EXAMPLES 8 and 9

To each of two kettles with a reflux cooler and a stirrer, 100 parts of phenol, 650 parts of 37% formalin, and 10 parts of oxalic acid were charged. The temperature of each kettle was gradually elevated, and upon reaching 96° C., was refluxed for 120 minutes. 10 parts of methylene bis-stearic amide, and 2 and 672 parts each of cobalt carbonate were added to each of these kettles. After mixing, the reaction mixtures were dehydrated under vacuum and dumped to obtain 972 and 1640 parts of novolac-type phenolic resins, respectively. Proportions of carbonates incorporated into 100 parts of said each novolac-type phenolic resin were 0.2 and 70 parts, respectively.

PREPARATION EXAMPLE 10

To a kettle with a reflux cooler and a stirrer, 1000 parts of phenol, 1795 parts of 37% formalin, 160 parts of 28% aqueous ammonia, and 50 parts of 50% sodium hydroxide solution were added. The temperature of the mixture was gradually elevated. When the temperature reached 96° C., it was refluxed for 30 minutes. 40 parts of ethylene bis-stearic amide was added. After dehydration under vacuum, it was dumped from the kettle, and cooled rapidly, to obtain 1100 parts of resole-type phenolic resin.

EXAMPLE 1

Preheated at 130° to 140° C., 7000 parts of Sanei No. 6 silica sand were charged into each of three whirl-mixers. After adding 140 parts each of three novolac-type phenolic resins obtained according to Preparation Example 1, 2 and 3, respectively, they were mixed for 40 seconds, and 21 parts of hexamethylene tetramine dissolved in 105 parts of water were added thereto. Each mixture was further mixed until it crumbled. 7 parts of calcium stearate were added thereto, and after 30 seconds mixing, discharged and aerated to obtain three samples of resin-coated sand.

EXAMPLE 2

Preheated at 130° to 140° C., 7000 parts of Sanei No. 6 silica sand were charged into each of three whirl-mixers. After adding 140 parts each of three resole-type phenolic resins obtained according to Preparation Examples 4, 5 and 6, respectively, they were mixed for 40 seconds and 105 parts of cooling water were added thereto. Each mixture was further mixed until it crumbled. 7 parts of calcium stearate were added thereto, and after 30 seconds mixing, discharged and aerated to obtain the three samples of resin-coated sand.

EXAMPLE 3

Preheated at 130° to 140° C., 7000 parts of Sanei No. 6 silica sand were charged into each of two whirl-mixers. After adding 130 parts of novolac-type phenolic resin obtained according to Preparation Example 7 thereto, they were mixed for 20 seconds and an additional 20 seconds after adding 13 parts of cobalt carbonate to one and sodium bicarbonate to the other. After adding 105 parts of water containing 21 parts of hexamethylene tetramine, each mixture was mixed until it crumbled. 7 parts of calcium stearate were added thereto, and after 30 seconds mixing, discharged and aerated to obtain two samples of resin-coated sand.

EXAMPLE 4

Preheated at 130° to 140° C., 7000 parts of Sanei No. 6 silica sand were charged into each of two whirl-mixers. After adding 13 parts of cobalt carbonate to one and sodium bicarbonate to the other, they were mixed for 20 seconds. Successively 78 parts each of novolac-type phenolic resin obtained according to Preparation Example 7 and 52 parts each of resole-type phenolic resin obtained according to Preparation Example 10 were added thereto and mixed for 20 seconds. To both mixers 63 parts of water containing 13 parts of hexamethylene tetramine were added and mixed until it crumbled. 7 parts of calcium stearate were added thereto, and after 30 seconds mixing, discharged and aerated to obtain two samples of resin-coated sand.

COMPARATIVE EXAMPLE 1

Preheated at 130° to 140° C., 7000 parts of Sanei No. 6 silica sand were charged into each of three whirl-mixers. After adding 140 parts each of novolac-type phenolic resin obtained according to Preparation Example 7, 8 and 9, thereto, followed by 40 seconds mixing, 105 parts of water containing 21 parts of hexamethylene tetramine were added. Each mixture was further mixed until it crumbled. 7 parts of calcium stearate were added thereto, and after 30 seconds mixing, discharged and aerated to obtain three samples of resin-coated sand.

COMPARATIVE EXAMPLE 2

Preheated at 130° to 140° C., 7000 parts of Sanei No. 6 silica sand were charged into a whirl-mixer. After adding 140 parts of resole-type phenolic resin obtained according to Preparation Example 10, it was mixed for 40 seconds. 105 parts of cooling water were added and it was mixed until it crumbled. 7 parts of calcium stearate were added thereto, and after 30 seconds mixing, discharged and aerated to obtain the resin-coated sand.

Table 1 indicates characteristics of various kinds of resin-coated sand and the shake-out property of shell-molds obtained therefrom according to Examples 1, 2, 3 and 4, and Comparative Examples 1 and 2, respectively.

Test Methods

Bending strength: according to JACT method SM-1
Stick point: according to JACT Method C-1
Tensile strength under elevated temperature: according to JACT Method SM-10
Shake-out property:
  Preparation of specimen:
    Coated sand is fed into an iron pipe of 29 mm in diameter and 150 mm in length. After 30 minutes baking, it is covered with aluminum foil and further heated for 3 hours at 370° C. After cooling, the sand-molded pipe was removed.
  Test method:
    The specimen is hit by the impact arm of the apparatus illustrated in FIG. 1. Crumbled sand is removed from the pipe after each flogging. Weighing the residual molded sand of the specimen until it becomes zero, the shake-out property is defined by the number of floggings required.
  Test Apparatus:
    In FIG. 1, A is a molded sand specimen and B is the arm which revolves around pivot C. 30 cm (H) and above A. Said arm is at first set horizontally, and then allowed to drop so as to flog said specimen.

TABLE 1

|  | Example | | | | | | | | | | Comparative Example | | |
|---|---|---|---|---|---|---|---|---|---|---|---|---|---|
|  | 1 | | | 2 | | | 3 | | 4 | | 1 | | 2 |
| Preparation Example | 1 | 2 | 3 | 4 | 5 | 6 | 7 | 7 + 10 | 7 + 10 | 7 + 10 | 7 | 8 | 9 | 10 |
| Carbonates incorporated | A | B | C | A | B | C | A | C | A | C | — | A | A | — |
| Incorporating proportion of carbonates in 100 parts of phenolic resin (parts) | 10 | 10 | 10 | 20 | 20 | 20 | 10 | 10 | 10 | 10 | 0 | 0.2 | 70 | 0 |
| Resin-coated Stick point (°C.) | 102 | 102 | 102 | 100 | 100 | 101 | 102 | 102 | 100 | 100 | 102 | 102 | 104 | 98 |

TABLE 1-continued

| | | Example 1 | | | Example 2 | | | Example 3 | | Example 4 | | Comparative Example 1 | | | Comparative Example 2 |
|---|---|---|---|---|---|---|---|---|---|---|---|---|---|---|---|
| Preparation Example | | 1 | 2 | 3 | 4 | 5 | 6 | 7 | 7+10 | 7 | 7+10 | 7 | 8 | 9 | 10 |
| sand Shell-mold | Bending strength (Kg/cm$^2$) | 30.5 | 30.3 | 30.0 | 29.8 | 28.7 | 27.3 | 30.6 | 30.1 | 30.0 | 28.7 | 31.0 | 31.1 | 8.5 | 29.0 |
| | Tensile strength under heat (Kg/cm$^2$) at 250° C. 30 sec | 2.6 | 2.5 | 2.4 | 1.7 | 1.6 | 1.5 | 2.5 | 2.4 | 2.2 | 2.1 | 2.5 | 2.4 | 0.4 | 1.9 |
| | 45 sec | 5.0 | 5.1 | 4.9 | 3.1 | 3.0 | 3.0 | 5.0 | 5.0 | 4.1 | 4.0 | 5.1 | 5.0 | 1.5 | 3.1 |
| | 60 sec | 8.3 | 8.2 | 8.0 | 6.6 | 6.4 | 6.3 | 8.2 | 8.0 | 7.7 | 7.4 | 8.2 | 8.3 | 1.6 | 6.6 |
| | Shake-out property (times) | 12 | 12 | 13 | 8 | 9 | 9 | 12 | 12 | 10 | 11 | 31 | 30 | 5 | 27 |

Note: Carbonates incorporated
A: Cobalt carbonate
B: Manganese carbonate
C: Sodium bicarbonate

We claim:

1. A resin-coated foundry sand for shell-molding operations comprising coating foundry sand with a phenolic resin and a carbonate and/or bicarbonate of elements selected from groups Ia, IIa, IIIb, IVb, Vb, VIb, VIIb or VIII of the Periodic Table of Elements wherein the ratio of carbonate and/or bicarbonate to phenolic resin is about 0.5–50 parts by weight to 100 parts by weight phenolic resin.

2. Resin-coated sand according to claim 1, wherein the carbonate is cobalt carbonate or manganese carbonate.

3. Resin-coated sand according to claim 1, wherein the bicarbonate is sodium bicarbonate.

4. Resin-coated sand according to claim 1, wherein said phenolic resin is a novolac phenolic resin.

5. Resin-coated sand according to claim 1, wherein said phenolic resin is a resole resin.

6. Resin-coated sand according to claim 1, wherein said phenolic resin is a mixture of novolac and resole phenolic resins.

7. Resin-coated sand according to claim 1, further comprising a lubricant.

8. Resin-coated sand according to claim 4, further comprising a lubricant.

9. Resin-coated sand according to claim 5, further comprising a lubricant.

10. Resin-coated sand according to claim 6, further comprising a lubricant.

11. A method for producing resin-coated sand for shell-molding operations having improved shake-out properties comprising coating foundry sand with phenolic resin and a carbonate and/or bicarbonate of elements selected from groups Ia, IIa, IIIb, IVb, Vb, VIb, VIIb or VIII of the Periodic Table of Elements wherein the ratio of carbonate and/or bicarbonate to phenolic resin is from about 0.5–50 parts by weight to 100 parts by weight phenolic resin.

12. A method for producing resin-coated sand according to claim 11, wherein the carbonate is cobalt carbonate or manganese carbonate.

13. A method for producing resin-coated sand according to claim 11, wherein the bicarbonate is sodium bicarbonate.

14. A method for producing resin-coated sand according to claim 11, wherein the phenolic resin is a novolac phenolic resin.

15. A method for producing resin-coated sand according to claim 11, wherein the phenolic resin is a resole phenolic resin.

16. A method for producing resin-coated sand according to claim 11, wherein the phenolic resin is a mixture of novolac and resole phenolic resins.

17. A method for producing resin-coated sand according to claim 11, further comprising a lubricant.

18. A method for producing resin-coated sand according to claim 14, further comprising a lubricant.

19. A method for producing resin-coated sand according to claim 15, further comprising a lubricant.

20. A method for producing resin-coated sand according to claim 16, further comprising a lubricant.

* * * * *